(12) United States Patent
Kim et al.

(10) Patent No.: US 8,483,269 B2
(45) Date of Patent: Jul. 9, 2013

(54) SYSTEM AND METHOD FOR TRANSMITTING/RECEIVING THREE DIMENSIONAL VIDEO BASED ON DIGITAL BROADCASTING

(75) Inventors: Sung-Hoon Kim, Daejon (KR); Byung-Jun Bae, Daejon (KR); Kug-Jin Yun, Daejon (KR); Jae-Young Lee, Daejon (KR); Seung-Won Kim, Fairfax, VA (US); Chung-Hyun Ahn, Daejon (KR); Nam-Ho Hur, Daejon (KR); Soo-In Lee, Daejon (KR); Chieteuk Ahn, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 1090 days.

(21) Appl. No.: 12/096,198

(22) PCT Filed: Dec. 11, 2006

(86) PCT No.: PCT/KR2006/005379
§ 371 (c)(1),
(2), (4) Date: Jun. 5, 2008

(87) PCT Pub. No.: WO2007/067020
PCT Pub. Date: Jun. 14, 2007

(65) Prior Publication Data
US 2008/0310499 A1    Dec. 18, 2008

(30) Foreign Application Priority Data

Dec. 9, 2005  (KR) .................. 10-2005-0120700
Jul. 25, 2006  (KR) .................. 10-2006-0069959

(51) Int. Cl.
*H04N 7/12* (2006.01)
(52) U.S. Cl.
USPC ............... 375/240.01; 725/105; 375/240.08; 348/42; 345/419

(58) Field of Classification Search
None
See application file for complete search history.

(56) References Cited

U.S. PATENT DOCUMENTS

2004/0017853 A1* 1/2004 Garrido et al. .......... 375/240.16
2004/0120396 A1* 6/2004 Yun et al. ................. 375/240.01
(Continued)

FOREIGN PATENT DOCUMENTS

| JP | 2000-078611 | 3/2000 |
| JP | 2003-108193 | 4/2003 |

(Continued)

OTHER PUBLICATIONS

International Search Report mailed Mar. 19, 2007; PCT/KR2006/005379.

(Continued)

*Primary Examiner* — Ayaz Sheikh
*Assistant Examiner* — Nicholas Sloms
(74) *Attorney, Agent, or Firm* — Ladas & Parry LLP

(57) ABSTRACT

Provided is a system and method for transmitting and receiving 3D video based on digital broadcasting. The system includes: an encoder for generating 2D ES and 3D supplementary ES by encoding 2D video and 3D supplementary data; a packetizer for generating 2D video PES and 3D supplementary PES by packetizing the 2D video ES and the 3D supplementary ES; a PSI generator for generating a PSI; a TS generator for generating 2D video TS and 3D supplementary TS for the 2D video PES and the 3D supplementary PES; a multiplexer for multiplexing the transport streams to transmit the 2D video TS as a normal stream and transmit the 3D supplementary TS, the PSI TS and 3D video synch data TS as robust stream; and a modulator for modulating the multiplexed TS according to a DTV specification and transmitting the modulated TS.

16 Claims, 2 Drawing Sheets

U.S. PATENT DOCUMENTS

2005/0223404 A1* 10/2005 Ishiguro et al. .................. 725/38
2006/0082575 A1* 4/2006 Auberger et al. .............. 345/421

FOREIGN PATENT DOCUMENTS

| | | |
|---|---|---|
| JP | 2004-357156 | 12/2004 |
| JP | 2005-510187 | 4/2005 |
| KR | 1019890015620 | 10/1989 |
| KR | 1019950010662 | 4/1995 |
| KR | 1019990060127 | 7/1999 |
| KR | 1020050111379 | 11/2005 |

OTHER PUBLICATIONS

ETSI; "Derivation of receiver interference parameters useful for planning fixed service point-to-point systems operating different equipment classes and/or capacitites", ETSI TR 101 854 V1.2.1, Jun. 2003, 28 pages.

* cited by examiner

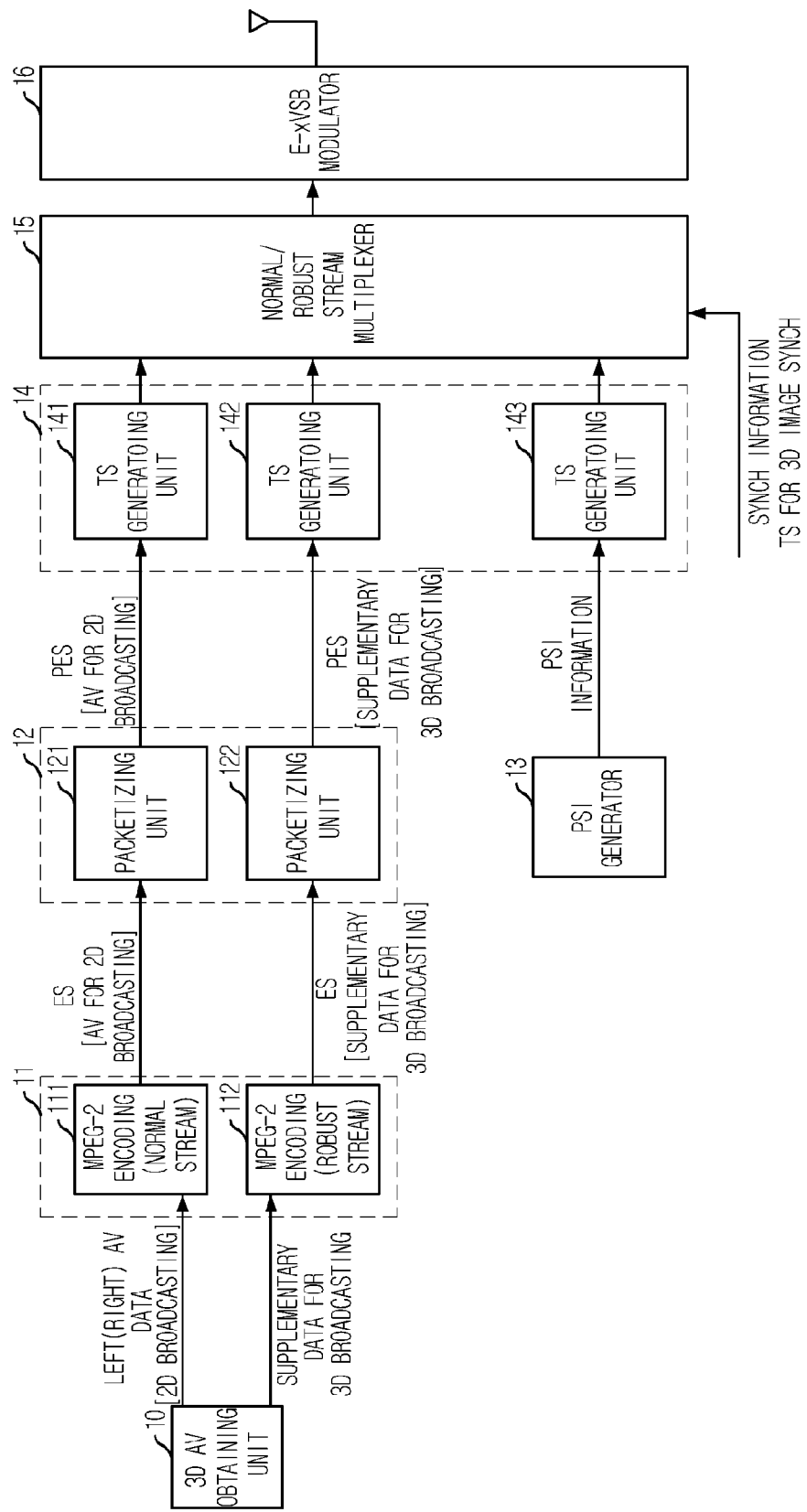
[Fig. 1]

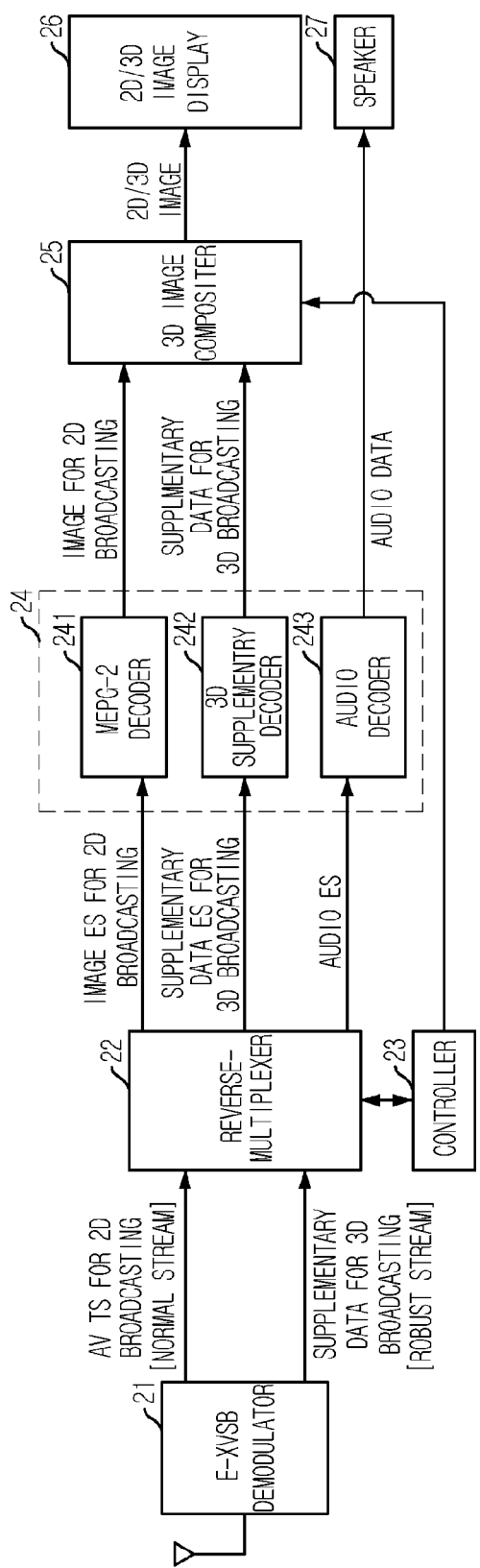
[Fig. 2]

SYSTEM AND METHOD FOR TRANSMITTING/RECEIVING THREE DIMENSIONAL VIDEO BASED ON DIGITAL BROADCASTING

TECHNICAL FIELD

The present invention relates to a system and method for transmitting/receiving three dimensional (3D) video based on digital broadcasting; and more particularly, to a system and method for transmitting/receiving 3D video for enabling 3D digital broadcasting while sustaining the backward compatibility with a conventional two dimensional (2D) digital broadcasting system by transmitting a 2D image stream as an normal stream and transmitting the supplementary information for 3D broadcasting, for example, image data of other view points, depth information, and disparity information, using a robust stream synchronized with the normal stream based on ATSC E-VSB scheme used in conventional digital broadcasting.

BACKGROUND ART

Conventional 3D video transceiving technologies for servicing three dimensional (3D) video contents based on a digital broadcasting transmission system were introduced in a Korean Patent Publication No. 1999-00600127, entitled "Method and apparatus for transmitting/receiving 3D video in digital broadcasting," and published on Jul. 26, 1999, a Korean Patent Publication No. 1995-0010662 entitled "Method for processing 3D video signal transmitting and receiving 3d broadcasting", and published on Apr. 28, 1995, and a Korean Patent Publication No. 1989-0015620 entitled "Television for receiving 3D video signal", and published on Aug. 30, 1989.

According to these conventional 3D video transceiving technologies, a transmitter transmits a MPEG-TS with supplementary packet identifier (PID) information for identifying a left image data and a right image data of a stereoscopic 3D video additionally with typical PID information that represents whether the MPEG-TS is audio/video data or supplementary data. Then, a receiver extracts left image data and right image data from a 3D video data, and reproduces the 3D video using two decoders. As described above, the conventional technologies splits the left image data and the right image data by adding the supplementary PID value into four program map tables (PMT) for identifying a left video signal, a right video signal, an audio signal and supplementary information.

As described above, the conventional 3D transceiving technologies use a plurality of independent program map tables for the left image and the right image in order to display a stereoscopic 3D video. The plurality of program map tables increase the system complexity. Also, the conventional 3D transceiving technologies have the incompatibility problem with a typical digital broadcasting technology that uses one PMT per each channel. Since the conventional 3D transceiving technology has a program specific information (PSI) and transport stream (TS) structure for displaying only 3D video, it further have incompatibility problem to a typical broadcasting system that displays only 2D video.

Also, the information for generating 3D video includes image data of two view points, image data of one view point with a disparity map, or image data of one view point with a depth map. However, the conventional technology teaches only image data of two view points.

DISCLOSURE OF INVENTION

Technical Problem

It is, therefore, an object of the present invention to a system and method for transmitting/receiving 3D video for enabling 3D digital broadcasting while sustaining the backward compatibility with a conventional two dimensional (2D) digital broadcasting system by transmitting a 2D image stream as an normal stream and transmitting 3D supplementary data for 3D broadcasting, for example, image data of other viewpoints, depth information, and disparity information, using a robust stream synchronized with the normal stream based on ATSC E-VSB scheme used in conventional digital broadcasting.

Technical Solution

In accordance with one aspect of the present invention, there is provided a system for transmitting three dimensional (3D) video based on digital broadcasting, including: an encoding unit for generating two dimensional (2D) video elementary stream (ES) and 3D supplementary data ES by independently encoding 2D video and 3D supplementary data; a packetizing unit for generating a 2D video packetized ES (PES) and a 3D supplementary PES by independently packetizing the 2D video ES and the 3D supplementary ES generated at the encoding unit; a program specific information (PSI) generating unit for generating a PSI representing the 3D supplementary data is transmitted as a robust stream; a transport stream (TS) generating unit for generating a 2D video TS and a 3D supplementary TS for the 2D video PES and the 3D supplementary PES from the packetizing unit and a PSI TS for the PSI generated from the PSI generating unit; a multiplexing unit for multiplexing the transport streams from the TS generating unit to transmit the 2D video TS as a normal stream and to transmit the 3D supplementary TS, the PSI TS and a 3D video synch data TS as a robust stream; and a modulating unit for modulating the multiplexed TS according to a specification of a digital television (DTV) and transmitting the modulated TS.

In accordance with another aspect of the present invention, there is provided a system for receiving three dimensional (3D) video based on digital broadcasting including: a demodulating unit for receiving a digital broadcasting signal and splitting the received digital broadcasting signal into a normal stream and a robust stream; a de-multiplexing unit for extracting a program specific identification (PSI) data and a 3D video synch data from the robust stream, extracting a 2D video TS and a 3D supplementary TS from the normal stream and the robust stream using the extracted PSI data, and outputting the extracted 2D video TS and 3D supplementary TS in forms of a 2D video ES and a 3D supplementary ES; a decoding unit for decoding the 2D video ES and the 3D supplementary ES from the de-multiplexing unit; a 3D video mixing unit for bypassing the decoded 2D video from the decoding unit according to a display type requested by a user, or producing a 3D video by mixing the decoded 2D video and 3D supplementary data from the decoding unit; and a controlling unit for controlling the 3D video mixing unit to generate the 3D video using the 3D video synch data extracted from the de-multiplexing unit.

In accordance with further another aspect of the present invention, there is provided a method for transmitting 3D video based on digital broadcasting, including the steps of: a) generating 2D video packetized elementary stream (PES) and 3D supplementary data packetized elementary stream (PES)

by independently encoding and packetizing 2D video and 3D supplementary data; b) generating a program specific identification (PSI) representing the 3D supplementary data is transmitted as a robust stream; c) generating a 2D video TS and a 3D supplementary TS for the 2D video PES and the 3D supplementary PES from the step a) and a PSI TS for the PSI generated from the step b); d) multiplexing the transport streams from the step c) to transmit the 2D video TS as a normal stream and to transmit the 3D supplementary TS, the PSI TS and a 3D video synch data TS as a robust stream; and e) modulating the multiplexed TS according to a specification of a digital television (DTV) and transmitting the modulated TS.

In accordance with further still another aspect of the present invention, there is provided a method for receiving 3D video based on digital broadcasting including the steps of: a) receiving a digital broadcasting signal and splitting the received digital broadcasting signal into a normal stream and a robust stream; b) extracting a program specific identification (PSI) data and a 3D video synch data from the robust stream, extracting a 2D video transport stream (TS) and a 3D supplementary TS from the normal stream and the robust stream using the extracted PSI data, and outputting the extracted 2D video TS and 3D supplementary TS in forms of a 2D video ES and a 3D supplementary ES; c) decoding the 2D video ES and the 3D supplementary ES from the step b); and d) bypassing the decoded 2D video from the step c) according to a display type requested by a user, or generating a 3D video by mixing the decoded 2D video and 3D supplementary data from the step c).

Advantageous Effects

A system and method for transmitting/receiving 3D video according to the present invention can minimize difficulties to embody a 3D video broadcasting system and provide the backward compatibility with the typical 2D digital broadcasting system by transmitting 3D supplementary data using additional robust stream based on ATSC E-VSB scheme used in conventional digital broadcasting.

Thus, the system and method for transmitting/receiving 3D video according to the present invention allows a user having a conventional digital broadcasting receiver to enjoy 2D video broadcasting and also allows a user having a 3D video digital broadcasting receiver to selectively enjoy one of 2D video or 3D video broadcasting.

BRIEF DESCRIPTION OF THE DRAWINGS

The above and other objects and features of the present invention will become apparent from the following description of the preferred embodiments given in conjunction with the accompanying drawings, in which:

FIG. 1 is a block diagram illustrating a system for transmitting 3D video based on digital broadcasting in accordance with an embodiment of the present invention; and FIG. 2 is a block diagram illustrating a system for receiving 3D video based on digital broadcasting in accordance with an embodiment of the present invention.

BEST MODE FOR CARRYING OUT THE INVENTION

Other objects and aspects of the invention will become apparent from the following description of the embodiments with reference to the accompanying drawings, which is set forth hereinafter.

FIG. 1 is a block diagram illustrating a system for transmitting three-dimensional (3D) video based on digital broadcasting in accordance with an embodiment of the present invention. Hereinafter, a method for transmitting 3D video according to an embodiment of the present invention will be described with the system for transmitting/receiving 3D video.

As shown in FIG. 1, the 3D video transceiving system according to the present embodiment includes a 3D AV obtaining unit 10, an encoder 11, a packetizer 12, a program specific information (PSI) generator 13, a transport stream (TS) generator 14, a normal/burst stream multiplexer (Normal/Robust stream MUX) 15, and an E-xVSB modulator 16.

The 3D AV obtaining unit 10 obtains 2D A/V data and 3D supplementary data from 3D contents. Herein, the 2D A/V data is left and right audio/video data for 2D broadcasting and the 3D supplementary data denotes supplementary information for 3D broadcasting. That is, the 3D supplementary data is information for reproducing three-dimensional images and includes images of other view points different from that of the 2D image, a disparity map, a disparity map with residual data, and a disparity map with residual texture. Herein, the 2D image denotes images for two dimensional broadcasting. The images of other view points may be a right image if the 2D image is a left image, or it may be a left image if the 2D image is a right image.

The encoder 11 includes a plurality of encoding units 111 and 112. The encoder 11 independently encodes the AV data and the 3D supplementary data, which are outputted from the 3D AV obtaining unit 10, and generates elementary streams (ES) for each data. That is, the audio data and the 2D video data including one of the left and the right image are encoded by a corresponding one of the encoding units 111 and 112 independently. Also, the 3D supplementary data is encoded by the other independently. After encoding, the decoders 111 and 112 output the elementary streams. MPEG-2 encoding units may be used as the encoding units 111 and 112, or any widely known encoder having good compression efficiency may be used, for example, MPEG-4 AVC.

The packetizer 12 includes a plurality of packetizing units 121 and 122. The packetizing units 121 and 122 packetize the 2D AV elementary stream and the 3D supplementary elementary stream outputted from the encoder 11, thereby generating a packetized elementary stream (PES).

The program specific information (PSI) generator 13 generates PSI data that represents that the 3D supplementary data is transmitted as a robust stream. That is, the PSI generator 13 defines a PID value and a PMT for the 3D supplementary ES in order to transmit the 3D supplementary ES as the robust stream.

The transport stream (TS) generator 14 includes a plurality of TS generating units 141 to 143. The TS generating units 141 to 143 generate transport streams (TS) for the PES outputted from the packetizing units 121 and 122 and the PSI data outputted from the PSI generator 13. That is, the TS generator 14 outputs a 2D AV TS, a 3D supplementary TS and a PSI TS. Herein, the 2D AV TS is an audio transport stream and a 2D video transport stream.

The Normal/Robust stream MUX 15 multiplexes the 2D AV TS, the 3D supplementary TS and the PSI TS in order to transmit the 2D AV TS through a normal stream, and transmit the 3D supplementary TS, the PSI TS and synch information for mixing a 3D video through a robust stream. Herein, the receiver will use the multiplexed 3D supplementary data and synch information for recovering a 3D video.

The E-xVSB modulator 16 modulates the multiplexed TS from the Normal/Robust stream MUX 15 according to a digital television (DTV) standard and transmits the modulated TS.

FIG. 2 is a block diagram illustrating a system for receiving 3D video based on digital broadcasting in accordance with an embodiment of the present invention. Hereinafter, a method for receiving 3D video according to an embodiment of the present invention will be described with the system for receiving 3D video.

Referring to FIG. 2, the 3D video receiving system according to the present embodiment includes an E-xVSB demodulator 21, a demultiplexer (DeMux) 22, a controller (control logic part) 23, a decoder 24, a 3D video mixer 25, a 2D/3D video display 26, and a speaker 27.

The E-xVSB demodulator 21 receives a digital broadcasting signal through an antenna. Herein, the digital broadcasting signal is transmitted based on a dual mode ATSC E-VSB scheme. After receiving, the E-xVSB demodulator 21 demodulates the received signal and obtains TSs. Then, the E-xVSB demodulator 21 splits the obtained TS into a normal stream and a robust stream.

The demultiplexer (DeMux) 22 receives the robust stream from the E-xVSB de-modulator 21, extracts the PIS data and the synch information for mixing the 3D video from the robust stream, and splits the normal stream and the robust stream into the 2D video TS and the 3D supplementary TS using the extracted PSI data. The de-multiplexer 22 generates PES by analyzing the split TS, and de-packetizes the generated PES, thereby outputting the split TS as an elementary stream.

The decoder 24 includes an MPEG-2 decoder 241, a 3D supplementary decoder 242, and an audio decoder 243. They decode the 2D ES, the 3D supplementary ES and the audio ES from the demultiplexer 22. Herein, the MPEG-2 decoder 241 decodes the 2D video ES outputted from the DeMux 22 according to the MPEG-2 specifications and outputs the decoded 2D video ES to the 3D mixer 25. The 3D supplementary decoder 242 decodes the 3D supplementary ES inputted from the DeMux 22 and outputs the decoded 3D supplementary ES to the 3D mixer 25. Also, the audio decoder 243 decodes the audio ES inputted from the DeMux 22 and outputs through the speaker 27.

The 3D mixer 25 bypasses 2D video inputted from the decoder 241 or generates a 3D video by mixing the 2D video and the 3D supplementary data inputted from the decoders 241 and 242. Then, the 3D mixer 25 outputs the generated 3D video to the 2D/3D video display 26.

That is, the 3D mixer 25 checks a display type inputted from a user. If the display type requested by the user is 2D image display, the 3D mixer 25 ignores the 3D supplementary data and bypasses the original video that is the 2D video transmitted as the normal stream to the 2D/3D video display 26. If the display type requested by the user is 3D image display, the 3D mixer 25 generates the 3D video by mixing the 2D video and the 3D supplementary data, and outputs the generated 3D video to the 2D/3D display 26. In the 3D video generating step, the 3D supplementary data formed of odd field images and even field images of the video signal is mixed in a line-by-line manner, thereby outputting SD level 3D video, where the SD level denotes a resolution of 720×480. Herein, garbage data in the 3D supplementary data is ignored. Also, the resolution of the 3D video may change depending on the display such as a monitor. Therefore, a video signal magnification/demagnification module may be added in a real display.

It is very important to accurately synchronize 2D video which is an original video, for example, a left image, and 3D supplementary data, for example, a right image, in a frame unit in order to reduce eyestrain.

The controller 23 controls the de-multiplexing operation of the DeMux 22, and controls the 3D video generating operation of the 3D mixer 25 using the synch data extracted at the DeMux 22. The controller 23 synchronizes the 2D video or the 3D video, which are outputted from the 3D mixer 25 to the 2D/3D video display 26 with the audio outputted from the audio decoder 243.

The 2D/3D video display 26 receives the 2D video or the 3D video transferred from the 3D video mixer 25, and the speaker 27 reproduces the audio data outputted from the audio decoder 243.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean patent application Nos. 2005-120700 and 2006-69959 filed with the Korean Intellectual Property Office on Dec. 9, 2005, and Jul. 25, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

The invention claimed is:

1. A system for transmitting three dimensional (3D) video based on digital broadcasting, comprising:

an encoding means for generating two dimensional (2D) video elementary stream (ES) and 3D supplementary data elementary stream (ES) by independently encoding 2D video and 3D supplementary data, wherein the 2D video data includes images of a 2D viewpoint, and each image of the 3D supplementary data is from a viewpoint that is different than the 2D viewpoint;

a packetizing means for generating a 2D video packetized ES (PES) and a 3D supplementary PES by independently packetizing the 2D video ES and the 3D supplementary ES generated at the encoding means;

a program specific information (PSI) generating means for generating a PSI representing the 3D supplementary data by defining a packet identifier (PID) value and a program map table (PMT) for the 3D supplementary data to transmit the 3D supplementary data as a robust stream;

a transport stream (TS) generating means for generating a 2D video TS and a 3D supplementary TS for the 2D video PES and the 3D supplementary PES from the packetizing means and a PSI TS for the PSI generated from the PSI generating means;

a multiplexing means for multiplexing the transport streams from the TS generating means to transmit the 2D video TS as a normal stream and to transmit the 3D supplementary TS, the PSI TS and a 3D video synch data TS as a robust stream; and a modulating means for modulating the multiplexed TS according to a specification of a digital television (DTV) and transmitting the modulated TS.

2. The system as recited in claim 1, further comprising a 3D broadcasting data obtaining means for obtaining 2D video data and 3D supplementary data from 3D video contents.

3. The system as recited in claim 1, wherein the 3D supplementary data includes a video of a different view point from the 2D video, a disparity map, a depth map, a disparity map with residual data, and a disparity map with residual texture.

4. A system for receiving three dimensional (3D) video based on digital broadcasting, comprising:
   a demodulating means for receiving a digital broadcasting signal and splitting the received digital broadcasting signal into a normal stream and a robust stream;
   a de-multiplexing means for extracting a program specific identification (PSI) data and a 3D video synch data from a PSI stream that is separate from the robust stream, extracting a 2D video transport stream (TS) and a 3D supplementary TS from the normal stream and the robust stream using the extracted PSI data, and outputting the extracted 2D video TS and 3D supplementary TS in forms of a 2D video elementary stream (ES) and a 3D supplementary ES;
   a decoding means for decoding the 2D video ES and the 3D supplementary ES from the de-multiplexing means;
   a 3D video mixing means for bypassing the decoded 2D video from the decoding means according to a display type requested by a user, or producing a 3D video by mixing the decoded 2D video and 3D supplementary data from the decoding means; and
   a controlling means for controlling the 3D video mixing means to generate the 3D video using the 3D video synch data extracted from the de-multiplexing means.

5. The system as recited in claim 4, wherein the demodulating means obtains a transport stream (TS) by demodulating a digital broadcasting signal received through an antenna and splits the normal stream and the robust stream from the TS.

6. The system as recited in claim 4, wherein the digital broadcasting signal is a digital signal transmitted according to a dual stream mode of Advanced Television Systems Committee Advanced-vestigial sideband (ATSC E-VSB).

7. The system as recited in claim 4, wherein the 3D supplementary data includes a video of a different view point from the 2D video, a disparity map, a depth map, a disparity map with residual data, and a disparity map with residual texture.

8. The system as recited in claim 4, wherein the de-multiplexing means splits the 2D video TS from the normal stream, and splits the 3D video TS from the robust stream.

9. A method for transmitting three dimensional (3D) video based on digital broadcasting, comprising the steps of:
   a) generating two dimensional (2D) video packetized elementary stream (PES) and 3D supplementary data PES by independently encoding and packetizing 2D video and 3D supplementary data, wherein the 2D video data includes images of a 2D viewpoint, and each image of the 3D supplementary data is from a viewpoint that is different than the 2D viewpoint;
   b) generating a program specific identification (PSI) representing the 3D supplementary data by defining a packet identifier (PID) value and a program map table (PMT) for the 3D supplementary data to transmit the 3D supplementary data as a robust PSI stream;
   c) generating a 2D video TS and a 3D supplementary TS for the 2D video PES and the 3D supplementary PES from the step a) and a PSI TS for the PSI generated from the step b);
   d) multiplexing the transport streams from the step c) to transmit the 2D video TS as a normal stream and to transmit the 3D supplementary TS, the PSI TS and a 3D video synch data TS as a robust stream; and
   e) modulating the multiplexed TS according to a specification of a digital television (DTV) and transmitting the modulated TS.

10. The method as recited in claim 9, wherein the step a) includes the steps of: a-1) generating a 2D video elementary stream (ES) and a 3D supplementary ES by independently encoding the 2D video and the 3D supplementary data; and
   a-2) generating a 2D video packetized ES (PES) and a 3D supplementary PES by independently packetizing the 2D video ES and the 3D supplementary ES from the step a-1).

11. The method as recited in claim 9, wherein the 3D supplementary data includes a video of a different view point from the 2D video, a disparity map, a depth map, a disparity map with residual data, and a disparity map with residual texture.

12. A method for receiving three dimensional (3D) video based on digital broadcasting comprising the steps of:
   a) receiving a digital broadcasting signal and splitting the received digital broadcasting signal into a normal stream and a robust stream;
   b) extracting a program specific identification (PSI) data and a 3D video synch data from a PSI stream that is separate from the robust stream, extracting a 2D video transport stream (TS) and a 3D supplementary TS from the normal stream and the robust stream using the extracted PSI data, and outputting the extracted 2D video TS and 3D supplementary TS in forms of a 2D video elementary stream (ES) and a 3D supplementary ES;
   c) decoding the 2D video ES and the 3D supplementary ES from the step b); and
   d) bypassing the decoded 2D video from the step c) according to a display type requested by a user, or generating a 3D video by mixing the decoded 2D video and 3D supplementary data from the step c).

13. The method as recited in claim 12, further comprising the step of: e) controlling the generation of the 3D video using the 3D video synch data extracted from the step b).

14. The method as recited in claim 13, wherein the digital broadcasting signal is a digital signal transmitted according to a dual stream mode of Advanced Television Systems Committee Advanced-vestigial sideband (ATSC E-VSB).

15. The method as recited in claim 12, wherein the 3D supplementary data includes a video of a different view point from the 2D video, a disparity map, a depth map, a disparity map with residual data, and a disparity map with residual texture.

16. The method as recited in claim 12, wherein in the step b), the 2D video TS is separated from the normal stream and the 3D supplementary TS is separated from the robust stream.

* * * * *